Aug. 17, 1943.   A. A. ANDERSON   2,326,915
AUTOMATIC ADHESIVE TAPE DISPENSER
Filed Jan. 26, 1942   5 Sheets-Sheet 4
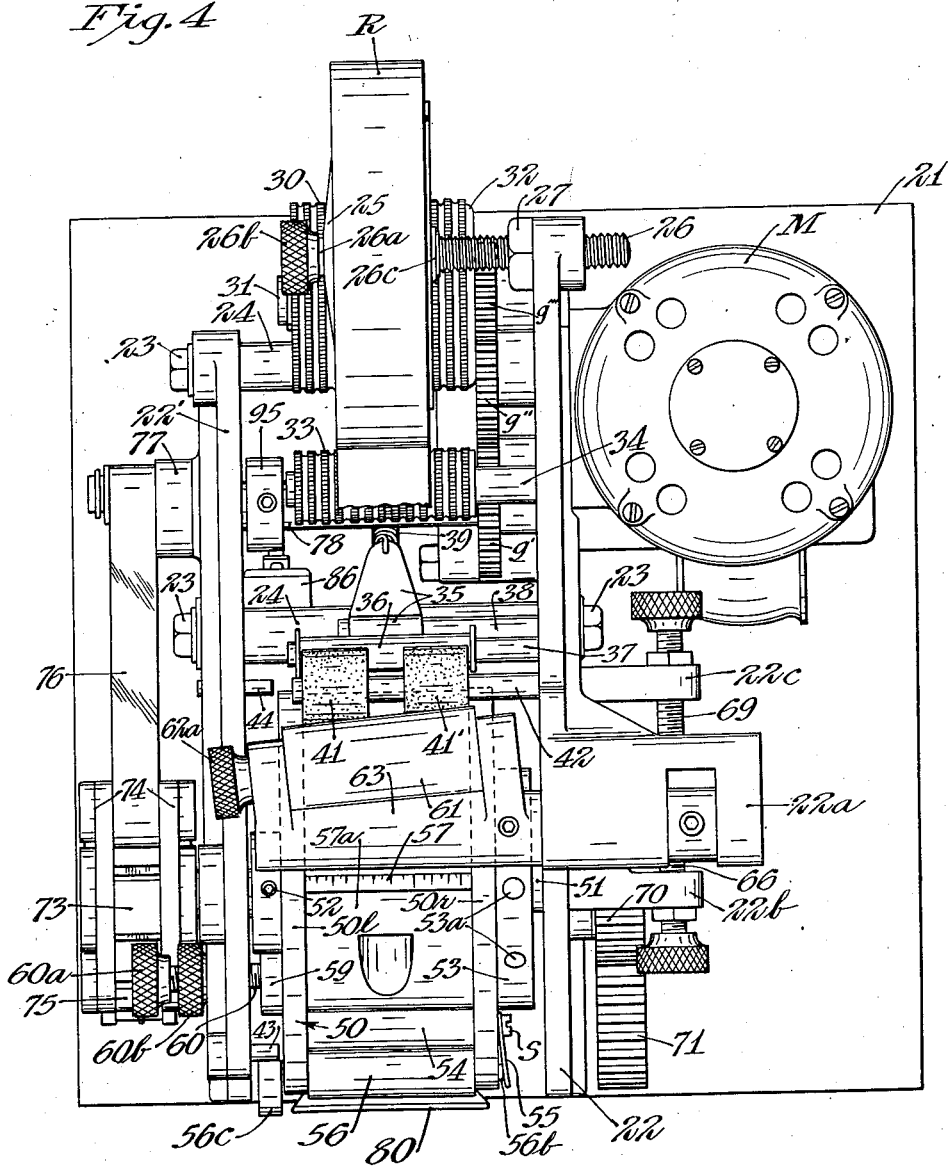
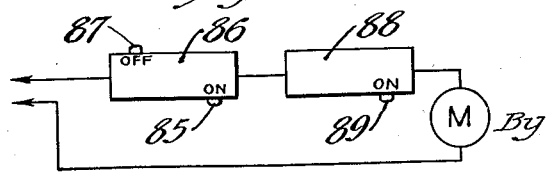
Inventor
Arthur A. Anderson
By Carpenter, Abbott, Coulter & Kinney
Attorneys

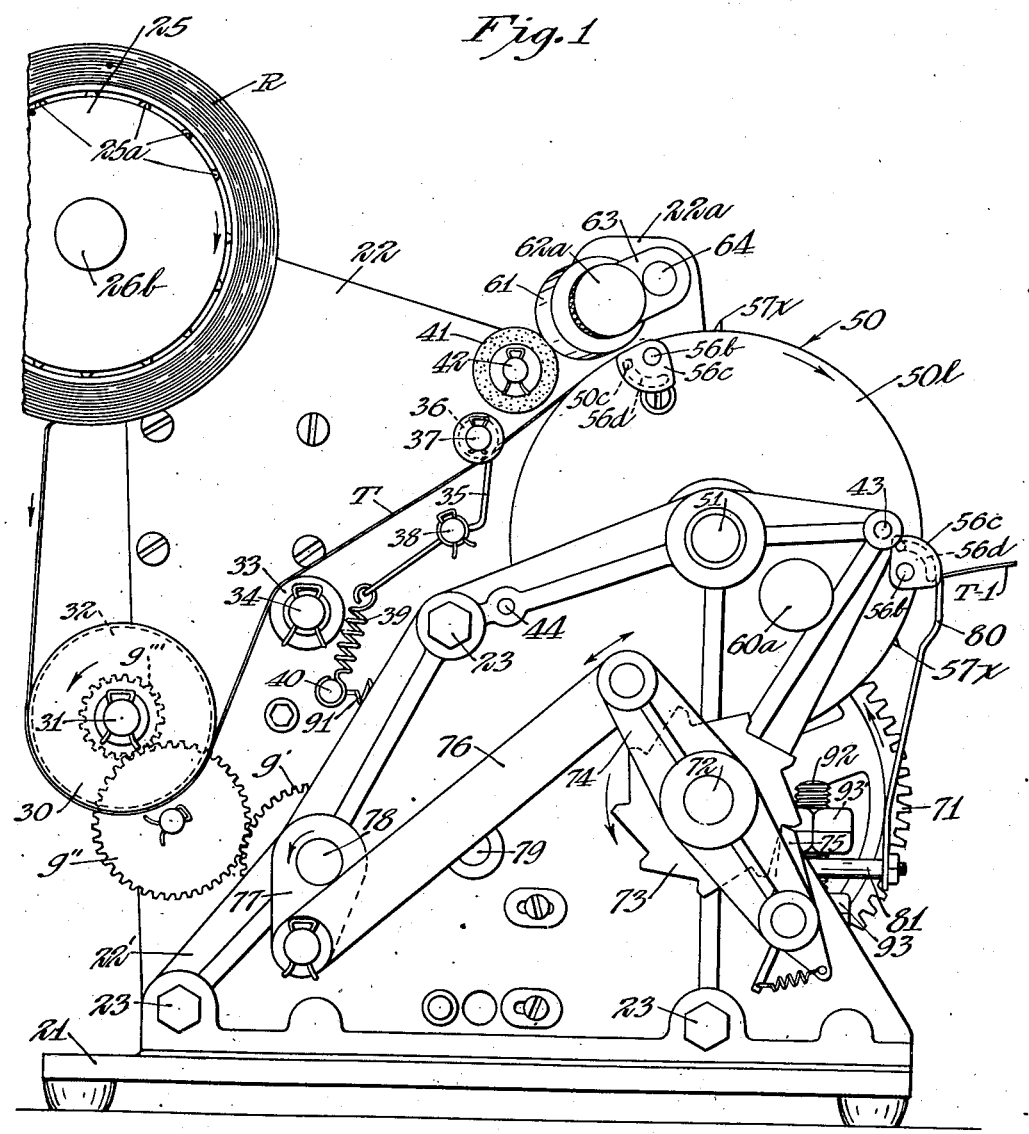

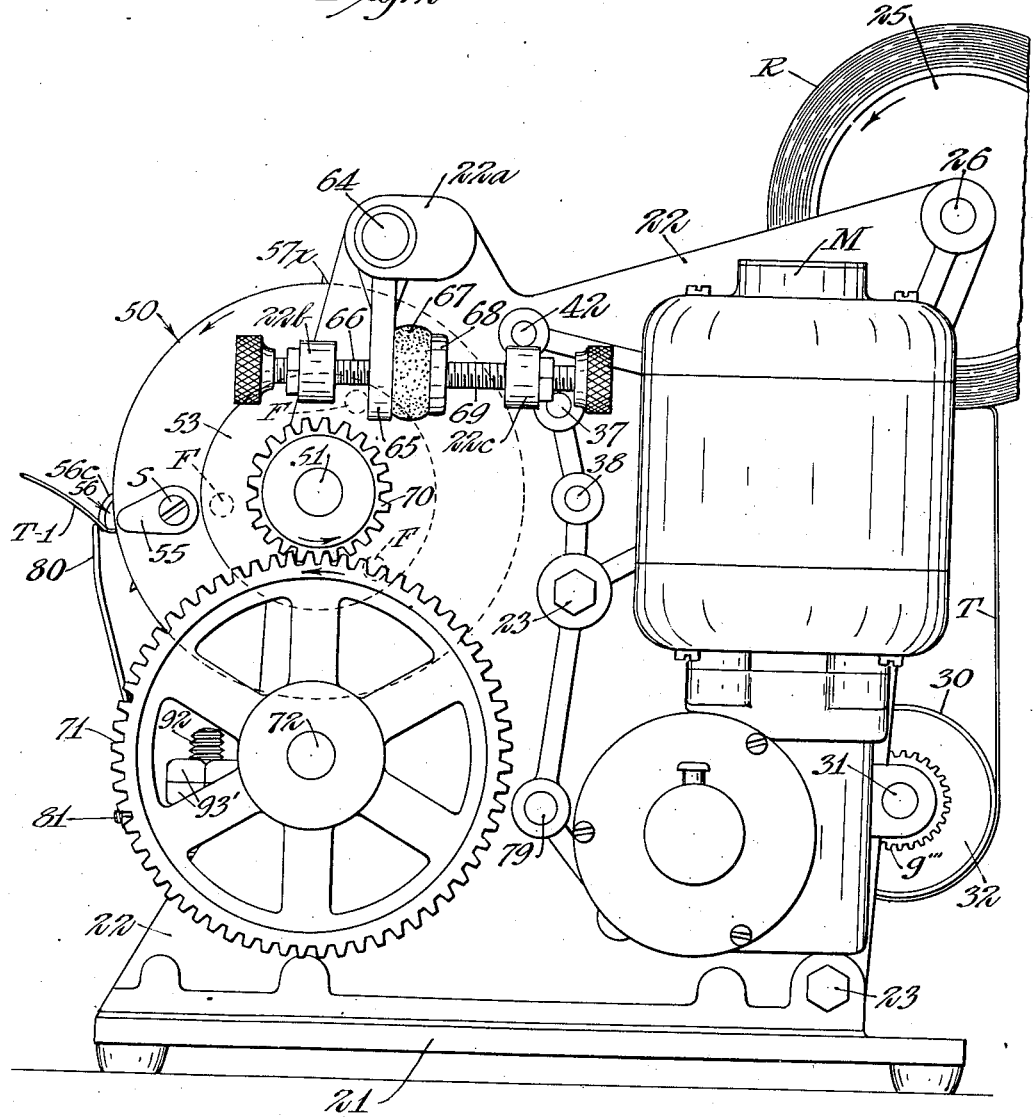

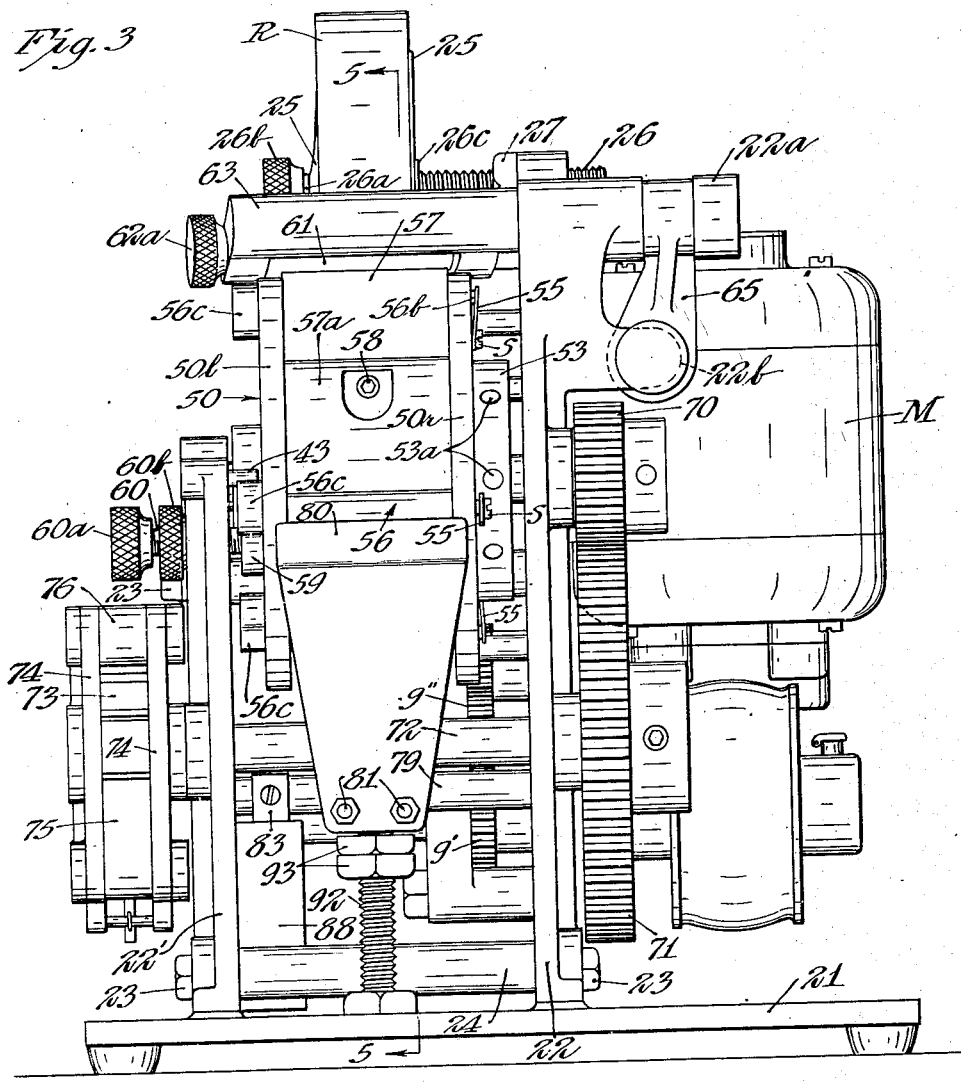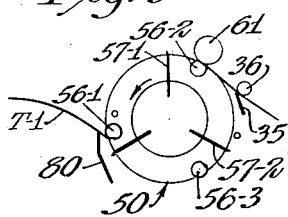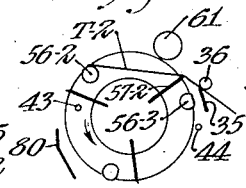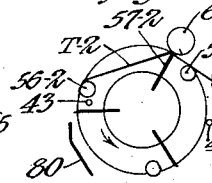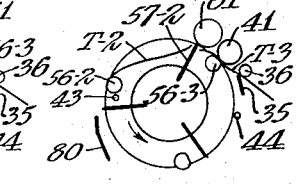

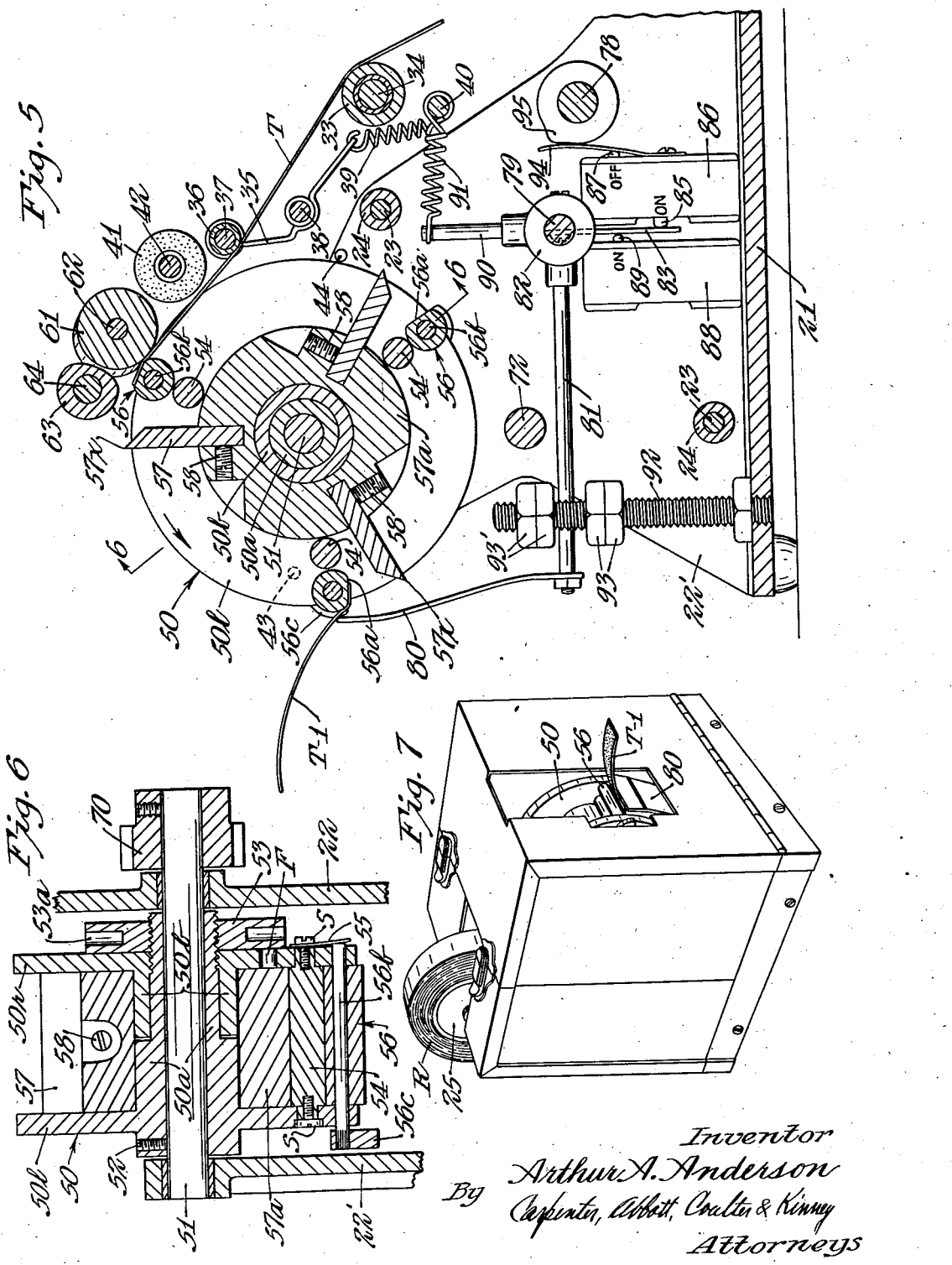

Patented Aug. 17, 1943

2,326,915

UNITED STATES PATENT OFFICE 2,326,915

AUTOMATIC ADHESIVE TAPE DISPENSER

Arthur A. Anderson, Rose Township, Ramsey County, Minn., assignor to Minnesota Mining & Manufacturing Company, St. Paul, Minn., a corporation of Delaware Application January 26, 1942, Serial No. 428,200

19 Claims. (Cl. 164—68)

This invention relates to dispensers for tape, especially tape that is coated with adhesive, particularly pressure-sensitive adhesive which is normally tacky without the necessity of being activated by solvents or heat.

An object is to provide an automatic motor-driven adhesive tape dispenser which will withdraw tape from a roll thereof, sever it into predetermined lengths, and successively position each severed length at a dispensing station so that it may be readily grasped and removed whenever desired. A further object is to provide an associated control system adapted to initiate operation of the dispenser automatically when a piece of severed tape is removed, in response to such removal, and to terminate operation when the next length of tape has been advanced, severed, and positioned for removal. Thus when an operator desires to use a piece of the tape, he finds it already severed and ready for removal. Upon removing it for use (such as sealing a box or package), the dispenser automatically goes into operation and makes ready a further piece of severed tape and positions it for removal. This saves time since the dispensing operation is being performed while the operator is applying the tape and the next piece is ready whenever the operator wants it, without any delay.

A further object is to provide a dispenser adapted to permit the length of severed tape to be quickly and readily varied, with provision for accurately severing successive pieces of tape in the desired length.

The problem of providing a dispenser of this type which is adapted for handling pressure-sensitive tape is not a simple one. Such adhesive tape is ever-tacky and sticks to whatever the adhesive surface touches, which makes it difficult to handle.

This invention provides improvements in the tape dispenser described and claimed in my co-pending application S. N. 400,143 filed June 27, 1941. The latter provides, inter alia, a holder for a supply roll of the tape, a "cutter wheel" and an "anvil member." The cutter wheel is equipped with tape-carrying means and with severing means and is adapted to receive the tape from the roll and to cut it into desired lengths by pressing it against the anvil member.

With reference to such type of dispenser, the present invention provides that the cutter wheel which carries and cuts the tape be so constructed that the gripping elements and the cutting elements may be adjustable in relation to each other to vary the distance between a gripper and its corresponding cutter. The said elements are normally in fixed position so far as the distance between them is concerned. The invention provides that one or both may be loosened, moved to the desired distance apart and then locked or fixed in the new position, whereby the length of pieces of tape that are severed by the device may be varied.

This may be accomplished by constructing the entire wheel as a whole in two separate units that are movable in relation to each other, one of said units carrying the tape gripping means, the other the severing means, with means for rendering the two units fixed in relation to each other.

The two units may be of various complementary designs, e. g., two cylindrical or wheel-like units co-axially mounted in which case one may fit within the other. For example, as in the herein illustrated embodiment, the gripping unit may comprise a hub and two flanges which carry the gripping means; the severing unit may be a large hub or nave with severing edges mounted thereon. The nave may be journaled on the hub co-axially therewith so that the severing edges and the gripping means are presented in alternatioin around the wheel's periphery. By turning the nave upon the hub (and then locking the two together) the distance from a gripper to the next succeeding edge may be varied, thereby varying the length of tape that will be severed when the entire wheel turns with the tape trained around it.

When, as in the illustrated machine, the cutter wheel's gripping elements hold or grip the tape by adhesive contact therewith, means may be provided for pressing the one on the other, and guide means may also be provided for releasably holding the uncut tape in a position to be contacted by the gripping means.

In connection with power driving means for intermittent operation of a dispenser in dispensing cycles whereby successive pieces of severed tape are brought to rest at a dispensing station in step-by-step fashion, the present invention provides means for automatically initiating said cycles by employing control means adapted to be actuated in response to the removal of a severed length of tape, so that upon such removal the dispenser is again set in motion to sever and to thrust out the next piece of tape ready for removal and use. In motor driven dispensers there may be a switch whose "on" point is pressed by a tripping means, the said tripping means being so placed and adapted that it is moved by the pressure of the severed length of tape as the latter is being withdrawn from the machine; or as in the present embodiment, there may be two switches, both of which must be closed to start the motor, a switch trip adjacent to said switches adapted to be moved during removal of a severed length of tape by the pressure thereof sufficiently to close one of said switches when the trip moves in response to the said pressure and sufficiently to close the second of said switches when the trip returns to its normal position after pressure of the tape is removed, whereby the initiation of a cycle may be postponed until after the previously dispensed length is entirely clear of the dispenser.

The specific machine that is described and illustrated in the following description and drawings as illustrative of my invention is a portable electrically operated automatic tape dispenser which operates intermittently in dispensing cycles whereby successive pieces of several tape are brought to rest at a dispensing station in step-by-step fashion, particularly suited for use in factory assembly lines, stores, studios, offices, workshops, etc., for rapid provision of accurately measured adjustable predetermined lengths of tape for sealing and/or labelling packages, boxes, folders, bags, bottles, cards, cartons and other objects.

In the accompanying drawings and description the end of the machine at which the operator stands when facing the machine to operate it is called the front end, and the terms "right" and "left" are from the point of view of such operator.

Figures 1 and 2 are left and right side elevations, respectively, of the machine.

Figure 3 is a front elevation.

Figure 4 is a plan view.

Figure 5 is a longitudinal vertical section taken through the approximate center of the machine on the line 5—5 in Figure 3. The rear of the machine is broken away.

Figure 6 is a longitudinal axial section of the cutter wheel taken on the line 6—6 in Figure 5.

Figure 7 is a perspective view of the machine encased.

Figure 8 is a wiring diagram.

Figures 9-12 are diagrammatic views of the cutter wheel showing the position of it and of its parts in relation to each other at various stages of a dispensing cycle.

To the base 21 are rigidly attached the two upright frames 22 and 22', each of which, in the present embodiment, is cast in one long relatively narrow piece. They are positioned longitudinally in relation to the machine, parallel with each other and are held in fixed spaced-apart relationship by three bolts 23 which pierce both frames.

Sleeves 24 hold the frames apart by being placed around the shanks of the bolts between the frames so that the length of the sleeves fixes the extent to which the frames can be drawn together by the bolts 23. All of the machine parts are supported directly or indirectly by the frames 22 and 22'. Base 21 may be of heavy weight to help prevent movement of the portable machine while in use.

The supply roll R of pressure-sensitive adhesive tape T is carried on the tape roll holder drum 25 towards the rear of the machine while the mechanism for withdrawing the tape, severing it into lengths and holding the lengths in position for grasping and removal at a dispensing station, is towards the front of the machine.

Tape holder drum 25 may be of a size to receive the standard commercial sizes of rolls of pressure-sensitive adhesive tape such as that sold under the trade-mark "Scotch," but if desired, the machine may be provided with several interchangeable drums of varying size. The periphery of drum 25 is provided at intervals with ridges 25a (Figure 1) extending parallel to the drum's axle so as to insure a tight fit between the drum and the roll of tape notwithstanding any possible slight variance in actual size of rolls that are used from time to time. The ridges also help to prevent slipping.

Tape holder drum 25 is rotatably mounted on frame 22 by means of axle-bolt 26 so that its axis is parallel to the base 21 and at right angles to the upright frames 22 and 22'. It is aligned so that the full width of tape T will contact the cutting elements or cutting edges on the cutter wheel 50 (hereafter described) as the tape is drawn forward from roll R through the machine.

Tape drum 25 is journaled on an unthreaded portion 26a of axle-bolt 26 so as to turn freely thereon between the axle-bolt head 26b and a flange 26c. The end of the axle-bolt is in threaded engagement with frame 22. Axle-bolt head 26b is knurled to form a thumb turn whereby to permit adjustment of the tape drum 25 laterally in respect to the machine as a whole so as to adjust roll R of tape T behind the cutter wheel in proper alignment. Lock nut 27 is provided to hold the axle-bolt tight in the frame after it has been adjusted.

A roller 30 around which the tape may be passed as it is led from the supply roll R to the cutter wheel, is rotatably mounted below the holder drum 25. It is journaled on horizontal shaft 31 which, in turn, is fixed in upright frame 22 so that the axis of roller 30 is parallel with that of the supply drum 25. It may be an idler roller, or, as in the illustrated embodiment, it may be power driven so as to serve as a "booster" roller to assist the power-driven cutter wheel in withdrawing the tape from the supply roll R.

The booster roller 30 is driven counterclockwise (Figure 1) by the three gears g', g'' and g''', the gear g' being keyed to the main power shaft 78. The gear g''' may be connected directly to the booster roller, but in the practical operation of the machine it is sometimes desirable that the turning impulse of the gear be transmitted to the roller through an over-running clutch to permit the roller to turn faster than the gear, if need be. The illustrated machine is so equipped, the roller being hollow and the gear g''' being fixed to a clutch wheel 32 which covers the open end of the roller and which drives the roller through an overrunning clutch mechanism (not shown) within the roller in a manner well known in the art.

In the illustrated machine the periphery of the roller 30 is knurled and grooved. Where a non-adhesive side of tape contacts a driving roller or draft wheel (as in the present machine) knurling and/or grooving of the roller's periphery affords a better grip of the tape by the roller; if the adhesive side of the tape contacts the roller such knurling and/or grooving serves to spread the points of contact over a wide space to provide an even pull and at the same time to reduce the actual area of the adhesive surface that is contacted so as to facilitate ready removal of the tape from the roller.

Forwardly of the booster roller and slightly above it is an idler roller 33 having a knurled and grooved periphery and being journaled on the horizontal shaft 34 which is fixed to frame 22.

A combined brake and guide means 35—36 to prevent the tape from moving except when being moved by the cutter wheel (e. g. to prevent back snap just after cutting) and through which to lead the tape from the idler roller 33 to the cutter wheel and by which to hold the tape in proper position adjacent the cutter wheel, is positioned forwardly of and above the idler roller, preferably sufficiently close to the cutter wheel so that the leading portion of the unsevered tape held in such guide means after the preceding length has been severed will be releasably held in a position to be contacted by the tape-gripping elements on the cutter wheel. The brake-guide 35—36 comprises a blade-shaped vertically positioned tape support 35 above which is positioned a guiding roller 36. The roller is of spool-like shape, having end flanges, and is rotatably mounted or journaled with its axis parallel with that of the cutter wheel, on a shaft 37 which is fixed in the frame 22. The top of the support 35 below the roller has a guiding edge somewhat shorter than the length of the roller, the support being positioned with the said edge adjacent the roller's periphery and parallel with its axis, thus forming a horizontal slot between the support and the roller through which the tape may pass. The lower portion of the support is bent or curved rearwardly and is pivotally supported at a point below and to the rear of its said upper edge on horizontal shaft 38, and its lower end is impelled downwardly by spiral spring 39 which is attached to it and to the stud 40, whereby the said top guiding edge of the tape support is pressed upwardly lightly against the under side of the guiding roller. The edge may be saw-toothed to minimize the adherence between it and the tape.

An additional guiding element such as the horizontal idler roller 41 may be placed above and forwardly of the brake-guide to prevent upward movement of the loose end of the tape such as when it tends to snap back when severed under tension. In the present illustration the roller 41 is in two sections or two short rubber rollers 41 and 41', rotatably mounted end to end on a shaft 42 which is fixed in frame 22.

The cutter wheel 50 is mounted with its axis perpendicular to the frame 22 and parallel with the base 21 on a shaft 51, which latter is journaled in the frames 22 and 22'.

Referring now to Figure 6, the cutter wheel 50 is made up of a gripping unit and a severing unit.

The gripping unit in this embodiment is the framework or main unit of the wheel, is made up of a hub and two flanges and is in two parts, one part comprising the left flange 50l and the inner portion 50a of the hub, the other part comprising the right flange 50r and the outer or sleeve portion 50b of the hub. The inner hub 50a extends to the left beyond the left flange 50l to receive the set-screw 52 whereby the cutter wheel 50 is fixed on the shaft 51; it extends to the right beyond the right flange 50r and is there threaded to receive the circular lock nut 53; it bears upon the shaft 51 for the full width of the wheel and the right half of its length is reduced in outer diameter to receive the outer hub 50b. When this main unit of the wheel is assembled by sliding the outer hub over the inner hub, the two parts are fixed together to form the single gripping unit by three spacer rods 54 whose ends are reduced in diameter to form shoulders between which the flanges are spaced apart. Both ends of the said spacers are axially bored and threaded to receive end screws S whose heads hold the flanges together, the right screws (Figure 6) serving also to hold leaf springs 55 in place against the outer face of the right flange 50r for a purpose described below.

Tape-gripping means adapted to contact a portion of the tape is provided in the form of three horizontal cylinders or grippers 56 spaced at intervals around the periphery of the flanges and pivotally mounted therebetween with their axes parallel to that of the hub. Each cylindrical gripper is flattened on one side to form a substantially plane surface running the full length of the cylinder parallel to its axis, to form the tape-gripping surface 56a (Figure 5). Each gripper is axially bored to receive a shaft 56b. The shaft and the gripper are fixed in relation to each other, the shaft extending beyond each end to form bearings which are journaled in the flanges 50l and 50r. The right end of each shaft 56b extends slightly beyond the outside face of the flange 50r so that ths leaf spring 55 pressing against the end of the shaft will brake the gripper against any turning except that impelled by the cam 56c, hereafter described. The left end of each shaft 56b extends beyond the outside face of the flange 50l a short distance and on it is fixed a quadrant shaped cam 56c whereby the gripper may be turned on its own axis.

Cam pins 43 and 44 are rigidly fixed to the right or inward side of the frame 22' and extend horizontally therefrom toward the cutter wheel. Pin 43 is positioned so as to strike each gripper cam 56c on one of its two straight sides as the cutter wheel turns. This turns the grippers one by one so as to turn the severed piece of tape (which each gripper is then holding) from cutting position to dispensing position. Pin 44 is positioned so as next to strike each cam on its other straight side as it passes and thereby to turn the grippers back again (about a quarter turn) from dispensing to cutting position.

By "dispensing position" is meant the position which a gripper occupies when it is holding the severed length of tape T—1 (Figure 5) out in position for grasping and removal at the dispensing station. By "cutting position" is meant the position which a gripper occupies when it is holding the tape while the tape is being cut by the cutters. In order to prevent the grippers from being turned beyond the desired position by the cams, gripper stops 50c (Figure 1) in the form of pins are fixed in the outer face of flange 50l, protruding outwardly therefrom at right angles. Complementary quadrant-shaped slots 56d are cut into the inner face of the gripper cams 56c to receive the stops 50c.

The severing unit of the cutter wheel 50 is in the form of a wheel whose "spokes" are the three blades 57 which extend radially from a large hub or nave 57a. This second wheel-like unit fits between the flanges 50l and 50r of the main unit, and the nave 57a is axially bored to receive within it the hub 50a—50b of the main unit so that the two "wheels" or units are coaxial. They are free to rotate one upon the other, but means for rendering them fixed in relation to each other is provided in the form of three cylinders F which are slidably mounted with their axes parallel with that of the cutter wheel in holes which pierce the right flange 50r. Their length is a few thousandths of an inch longer than the thickness of the flange (Figure 6) and they are located 120° apart in a common circle about the cutter wheel's axis (Figure 2) sufficiently close to said axis to be pressed by the lock-nut 53 so that tightening the lock-nut presses the cylinders through the flange of the gripping unit against the side wall of the nave 57a of the severing unit whereby the two said units are fixed in relation to each other to form the single cutter wheel 50. A change of the length of tape dispensed is therefore secured by loosening the nut 53, turning the severing unit to the desired point in relation to the main or gripping unit of the cutter wheel, and then tightening the nut. The nut 53 may be provided with radially extending holes 53a around its periphery to receive a wrench.

The blades 57 are removably mounted in or on the nave 57a, held by set-screws 58, to permit removal for sharpening and to permit positional adjustment, preferably with their severing edges 57x parallel with the axis of the cutter wheel 50.

Above and slightly to the rear of the cutter wheel 50 is positioned the anvil member which co-acts with the cutter wheel to sever the tape by reason of the severing edges 57x pressing the tape against said anvil member. In the present embodiment the anvil member is a rotatably mounted cylinder or cutting roller 61 positioned to permit it to contact the cutting edges 57x of each of the blades 57 successively as the wheel 50 turns.

The cutting roller 61 and the cutting edges 57x may be shaped and/or positioned so that a cutting edge contacts the roller at only a single point at any one time with the result that in operation, an edge contacts the roller point by point along the edge's length, which is preferable to having the full length of the edge contact the roller all at once. In the present embodiment this is accomplished by positioning the cylindrical cutting roller 61 in angular relation to the straight edges 57x.

This angular relation makes it necessary for the cutter or the cutting roller or both to move for some distance in relation to each other before the full length of any one cutting edge 57x can be brought into contact point by point with the cutting roller 61. In the present embodiment substantially all of the relative movement of the two parts past each other is effected by movement of the cutters 57.

Since each cutting edge thus moves for some distance in a circular path while it is in contact with the cutting roller, and since the cutting roller is preferably made of a relatively unyielding substance, and since it is preferable to have the full length of each cutting edge contacting the cutting roller at a substantially uniform pressure and at a pressure approximately equal to that of the other cutting edges, and for other reasons, the cutting roller is held yieldably rather than rigidly in its normal position.

The roller 61 is journaled on a shaft 62, which in turn is removably fixed in a U-shaped yoke 63, the latter being fixed through its bight on shaft 64. The latter shaft is journaled in the frame 22 parallel with the cutter wheel's axis. One end of the roller shaft 62 may have a thumbturn 62a and the other end be in threaded engagement with an arm of the yoke whereby the shaft 62 may be removed to permit removal of the cutting roller for replacement or resurfacing. The above mentioned angular relation between the roller and the cutting edges is secured in this embodiment by making one arm of the said yoke longer than the other, although the desired angularity may be secured by other means, for example, by placing the yoke supporting shaft 64 at an angle, so long as the full width of the tape being cut is pressed between the cutting edges 57x and the roller 61, preferably at a substantially uniform pressure.

The yoke-supporting shaft 64 extends to the right of the frame 22 for a distance, its outer end being journaled in a bracket 22a. A downwardly extending positioning arm 65 is fixed to the shaft 64 between the frame 22 and the bracket 22a. The lower end of the arm is contacted upon its forward side by the end of an adjusting rod 66 which extends horizontally, parallel to frame 22, and which pierces a bracket 22b in threaded engagement therewith. The end of the rod, by stopping forward movement of the positioning arm 65, limits the downward swing of the cutting roller. It is preferably adjusted so that the roller will come to rest at the nearest point to the cutter wheel 50 to which it comes at any time during the operation of the machine.

Similarly the upward swing of the roller is yieldingly limited by the cushion 67 which is of a resilient material such as rubber (or which may be a spring) and which contacts the rear side of the positioning arm 65. The cushion is held by a seat 68, which in turn is held by or attached to the cushion adjusting rod 69, the latter being supported by a bracket 22c and operated in a manner similar to that of the adjusting rod 66. The preferred adjustment is to set up a tension sufficient to exert a pressure between the severing edges 57x and cutting roller 61 during their time of contact that will sever the tape T.

In the illustrated machine, in addition to serving as the anvil member against which the severing elements of the cutter wheel are pressed, the roller 61 also serves as a pressing means for pressing the leading edge of the advancing unsevered tape into firmer adhesive engagement with the gripping surfaces 56a on each of the grippers 56 successively as the wheel turns them past the roller. Accordingly, in constructing the cutter wheel, the grippers 56 are positioned so that their gripping surfaces 56a when in cutting position, will lie in approximately the same periphery as do the cutting edges 57x so that when the combined cutting and pressing roller 61 is adjusted by rod 66 to make the proper contact with the one, it will do likewise with the other. Obviously the pressing means may be a member separate from the anvil member, if desired.

The anvil member 61 is preferably made of relatively hard material, though preferably softer than the cutting edges 57x. In the present embodiment, it is of steel. Brass, copper, aluminum, and other softer materials tend to become scored too rapidly by the cutters. The roller's periphery is preferably smooth. It gradually becomes scored by the cutting edges but will stand considerable use before needing replacement.

To rotate the cutter wheel 50, a pinion 70 is keyed to the right end of the cutter wheel shaft 51 and is engaged by the gear wheel 71 which is keyed to the gear shaft 72, the latter being journaled in the frames 22 and 22' below the cutter wheel. On the end of the gear shaft to the left of the frame 22' is keyed a ratchet wheel 73. Adjacent to the ratchet wheel, a ratchet arm 74 is journaled on the gear shaft 72 at the arm's midpoint, and a pawl 75 is pivotally mounted on the lower end of the arm in a position to turn the ratchet wheel 73 counterclockwise (Figure 1). A crank shaft 76 is pivotally attached to the upper end of the ratchet arm 74 and to the power crank 77, the latter being keyed to the horizontal power shaft 78, which is journaled in the frames 22 and 22' and turned by the worm wheel shaft of a worm gear reduction motor M.

The pawl and ratchet and the gearing which transmits their motion to the cutter wheel are of a size, design and position in relation to each other so that one actuating stroke of the pawl 75 rotates the cutter wheel clockwise (Figure 1) through a full dispensing cycle, which in the illustrated machine is one-third of a turn, or 120° (there being three equally spaced cutters in operation on the illustrated cutter wheel).

The power crank 77 and the ratchet arm 74 are of such relative sizes that the arm does not rotate a full revolution about its shaft 72, but has instead a rocking or back-and-forth motion. Since the pawl 75 actuates the ratchet only when the upper end of the ratchet arm is being drawn rearwardly by the rotating crank 77, the cutter wheel 50 is turned only during exactly 180° of turn of the crank 77. This permits the cutter wheel to be moved through a precise predetermined distance, and also provides the crank with 180° of "coast" within which to stop.

Means for initiating a dispensing cycle is provided in the form of a switch or switches in the circuit of the motor M. These in turn are actuated by a switch-actuating assembly or "tripping means" that is carried on a horizontal trip shaft 79 beneath the cutter wheel.

In front of the cutter wheel 50 a vertical bar 80 whose upper edge extends horizontally across the width of the cutter wheel, is positioned in such a manner that when the wheel comes to rest at the end of a dispensing cycle and the foremost of the grippers 56 is in dispensing position whereby the newly severed piece of tape adhering thereto is thrust out ready for grasping, such piece will lie across the said bar, the piece extending from the gripper 56 to the top edge of the bar and thence across the bar and out into space. Preferably, but not necessarily, the said top edge of the bar is slightly above the downwardly facing flat gripping surface 56a so that the severed strip of tape slopes upwardly as it extends from the gripper to the bar as shown in Figure 5, the object being to move the tripping bar 80 sufficiently to actuate a motor switch by the pressure of the tape against it upon removal of the severed piece for use.

The vertical tripping bar 80 is held on the front ends of a pair of horizontal switch rods 81 which extend lengthwise of the machine below the cutter wheel. Their rear ends are fixed in a boss 82 which is keyed to the horizontal trip shaft 79, the latter being journaled in frames 22 and 22'. A downwardly extending switch arm 83 is fixed to the trip shaft 79 in a position to actuate the switch or switches, as hereafter described. An upwardly extending switch spring arm 90 fixed in boss 82 is impelled rearwardly by a spiral switch spring 91 which is stretched between the arm 90 and the spring-holding stud 40, whereby the entire switch trip or switch tripping assembly is returned to its starting position each time the downward pressure against the trip bar 80 is removed. A threaded stud 92 is fixed vertically in base 21 adjacent the switch rods 81 and carries two pairs of lock-nuts 93 and 93' which may be fixed in positions below and above the switch rods respectively, to limit their upward and downward movement and thereby the movement of the entire tripping means.

The downwardly extending switch arm 83 fixed to the trip shaft 79 adjacent to the "on" point 85 of reset "micro switch" 86 (attached to frame 22') so that downward movement of the tripping bar 80 causes arm 83 to press rearwardly against the "on" point 85 sufficiently to turn the switch on. By a "reset" switch is meant one having two pins, one of which is pressed to make the circuit and the other to break it, such that when the "on" pin is pressed, the switch remains closed until the "off" pin is pressed, whereupon the switch opens and the "on" pin is raised to initial open position.

According to the present invention, the switch 86 may be connected so as to turn the motor on and off as its respective points are pressed, or, as illustrated herein, a second switch may be provided, connected so that both switches have to be closed to start the motor. Such second switch is here shown as a spring "micro switch" 88 located forwardly of the first switch 86 so that switch arm 83 presses the pin 89 forwardly far enough to hold switch 88 in closed position when the trip bar 80 is up in starting position. By a "spring" switch is meant a switch which has one pin and which remains closed only so long as the pin is pressed, and which opens as soon as the pin is released.

After the switch arm 83 leaves pin 85 and moves forward to press pin 89, reset switch 86 remains closed so that as soon as spring switch 88 is closed the circuit (Figure 8) is complete and remains so until broken by pressure of a leaf spring switch arm 94 against "off" pin 87. Switch arm 94 is mounted so as to be pressed against the "off" pin by a switch cam 95, said cam being adjustably fixed on the power shaft 78 in a position to shut the motor off in time for it to come to a stop while the power shaft 78 (and crank 77) is still within the 180° of "coast" above described.

It is sometimes desirable to provide a brake to prevent the cutter wheel from coasting, permitting it to turn only when impelled by the machine, thereby keeping the distance of turn within accurate control. This may take the form of a disc-shaped piece of leather 59 mounted on the end of a threaded brake rod 60 so that its broad flat surface may be pressed against the outer face of the flange 50l. The brake rod pierces the frame 22' at right angles thereto and in threaded engagement therewith. It is shown with a thumb-turn 60a and lock-nut 60b.

*Mode of operation*

The lock-nut 53 on the cutter wheel is loosened until the severing unit is free to turn upon the gripping unit, whereupon it is turned until a length of tape extending from a tape-gripping surface 56a on the gripping unit back to the next following cutting edge 51x on the severing unit (when carried in normal manner by the gripping surface) will equal the length of tape which it is desired to have the machine dispense. The nut 53 is then tightened until both units of the wheel are rigid in relation to each other. Since a gripper and its complementary cutter may be spread apart until the cutter touches the next following gripper, the machine may thus be adjusted to cut any length of tape up to approximately the straight line distance between two adjoining grippers 56 on the cutter wheel being employed.

A roll R of pressure-sensitive adhesive tape T is mounted on the drum 25, and positioned so that when the tape is led through the machine, the adhesive side faces down. The axle-bolt 26 on which the drum 25 is journaled is moved to the right or left (in relation to the machine) by turning the thumb-turn 26b until the roll R is aligned directly behind the cutters 57 on the cutter wheel 50.

The tape is led from the roll R down around the booster roller 30, thence forwardly over the idler roller 33 in adhesive contact therewith, thence forwardly through the brake-guide 35—36 (between the support 35 and the roller 36), thence beneath the rubber rollers 41—41' and lastly to one of the grippers 56 on the cutter wheel 50 at which point the leading edge of the tape is adhered to a tape-gripping surface 56a. In practice, threading usually requires that the motor be switched on by hand (by pressing the switch trip 80 down and then releasing it) for two or three dispensing cycles, to the end that when the threading is completed, the particular gripper 56 to which the leading edge of the tape adheres, shall have passed under the cutting and pressing roller 61 while the tape was adhering to it so that the tape has been pressed against the gripper and adheres firmly thereto by the time the cutter wheel is in starting position ready for the first dispensing cycle.

The motor is then again switched on by hand to cause the first piece of tape T—1 to be dispensed and held out in readiness for grasping (Figures 5 and 9) whereupon the machine is ready for normal automatic operation.

The piece of tape T—1 is grasped and removed from the machine by pulling it outwardly and/or downwardly away from the machine. The strength of the switch spring 91 (which holds the switch trip 80 up in starting position) is such that the trip 80 is impelled downwardly by the pressure of the piece of tape as soon as the operator begins to pull on it but before the pull by the operator on the tape has become great enough to break the piece away from its adhesive contact with the gripper 56. This downward movement of the trip 80 moves switch arm 83 to open spring switch 88 and to close reset switch 86. As soon as but not until, the piece T—1 is entirely removed and is clear of the machine so as to remove the downward pressure from the switch trip 80, the second switch 88 closes by reason of the arm 83 pressing forwardly against switch pin 89 when the trip 80 returns to normal or initial position. Both switches now being closed, the circuit is completed whereupon motor M begins to turn. One advantage of this switching arrangement is to postpone movement of any of the machine's parts until the dispensed piece of tape is entirely free from the machine; it reduces the chances of inadvertent starting before the machine is clear.

The motor M turns power shaft 78 and power crank 77 counterclockwise (Figure 1). This moves the top of the ratchet arm 74 forwardly until the crank has passed the dead-center whereupon the ratchet arm reverses and the pawl 75 engages the ratchet wheel 73 and moves the cutter wheel through 120° of turn, as previously described.

The power shaft 78 at the same time rotates the booster roller 30 counterclockwise (Figure 1), but since the cutter wheel has not yet begun to pull the tape and since the non-adhesive side of the tape contacts the roller, there is not enough friction between the tape and the roller to enable the roller alone to move the tape, so that the roller slips around inside the loop of tape. But when the cutter wheel 50 begins to turn, thereby tensing the tape, friction between the booster roller and tape increases, whereupon the roller begins to perform its function of aiding the cutter wheel in overcoming the inertia of the motionless tape especially at the beginning of the cycle.

Referring particularly to Figures 5, 9, 10, 11 and 12, the tape (whose forward portion is about to be severed and dispensed as piece T—2) is drawn forwardly as soon as the cutter wheel begins to turn by reason of the adherence of its forward end to the gripper 56—2 (Figure 10). The rotating booster roller 30 helps overcome any tendency of the tape to tear loose from the gripper 56—2 when the cutter wheel 50 is suddenly started at the beginning of the cycle. But after the cutter wheel is in motion, if the relative sizes of the various wheels are such that the tape is moved by the cutter wheel faster than the booster roller's peripheral rate, the overrunning clutch inside the roller will then permit the roller to run faster than its driving gear $g'''$. This is advantageous since the tape's frictional engagement with the roller is much tighter when it is being drawn by the cutter wheel during a cycle than it is when the cutter wheel is motionless.

As the cutter wheel continues to turn, the cutter 57—2 which will cut off the length T—2 comes up into contact with the under side of the tape (Figure 10). Also the next succeeding gripper 56—3 which will carry the unsevered tape after piece T—2 is severed, is turned a quarter turn on its axis by reason of its cam 56c striking the cam pin 44, thereby turning the gripper from dispensing to cutting position, i. e., with its flat tape-gripping surface 56a facing outwardly to receive the adhesive side of the tape.

Farther on in the turn, the tape is severed by being pressed between the edge 57x of cutter 57—2 and the cutting roller 61 (Figure 11) to form the piece or length T—2.

Figure 12 shows the position of the parts just after the piece T—2 has been severed. The front end of T—2 is still adhering to the gripper 56—2 which latter is about to be rotated on its axis a quarter turn from cutting to dispensing position by its cam 56c striking pin 43 thereby swinging piece T—2 outwardly until it occupies the same position that is occupied by T—1 in Figure 9. The newly made leading end of the unsevered portion behind the cutter 57—2 which will form the next piece T—3 is shown resting on the next gripper 56—3 and held from falling back by the brake-guide 35—36. As the wheel continues to rotate, the gripper 56—3 comes closer to the point where the tape T—3 will be pressed between gripper 56—3 and the cutter-presser roller 61, during which time additional factors which help to keep the end of the tape well up in place are the rollers 41—41' which crowd it towards the gripper. Just before or just as the cycle ends the gripper 56—3 and roller 61 press together to adhere the tape to the gripper in readiness for the next cycle.

At or about this time the power is turned off by the switch cam 95 which is fixed in a position on power shaft 78 to press switch arm 94, and thereby to press the "off" pin 87 of switch 86, at such a point in the turn that the motor will coast to a stop before the power crank 77 begins to impel the mechanism through the next dispensing cycle. The 180° of "coast" which the crank has, has proved to be ample for this when the motor acts through worm gears, as in the present embodiment.

It will be apparent that very accurate measurement of lengths of tape can be secured by machines embodying this invention and that such lengths may be varied without substitution of parts. Such accuracy and choice of lengths is of especial advantage when dispensing tape that is printed to form a series of labels, stickers, trade-mark emblems, etc.

It will also be apparent that the severing means here employed provides a smooth straight cut and the smoothness of the severing members prevents their becoming clogged with adhesive.

"Tape" and "sheet material" are regarded as being interchangeable terms, that is, "tape" is used herein as a generic term to refer to sheets that are long in proportion to width.

The illustrated machine is entirely automatic, nothing being required of an operator except that he use one hand to remove the pieces of tape as fast as they are dispensed.

Dispenser units embodying the principles of my invention may be built into packaging, labelling and wrapping machines, etc.

I claim:

1. In a device for dispensing tape, means for holding a supply roll of tape, a cutter wheel adapted to receive tape from the roll and an anvil member adjacent to said cutter wheel, said cutter wheel having tape-gripping means positioned thereon adapted to contact a portion of the tape, severing means on said wheel positioned in such a manner that the tape passes over said severing means when it is trained around the wheel, the said wheel being positioned so as to press the severing means against the anvil member as the wheel rotates, thereby severing the tape with the severed portion still held by the tape-gripping means, said gripping means and said severing means being adjustable in relation to each other to vary the distance between them, whereby the length of pieces of tape that are severed by the device may be varied.

2. In a device for dispensing tape, means for holding a supply roll of tape, a cutter wheel adapted to receive tape from the roll and an anvil member adjacent to said cutter wheel, said cutter wheel having tape-gripping means positioned thereon adapted to contact a portion of the tape, severing means on said wheel positioned in such a manner that the tape passes over said severing means when it is trained around the wheel, the said wheel being positioned so as to press the severing means against the anvil member as the wheel rotates, thereby severing the tape with the severed portion still held by the tape-gripping means, the said cutter wheel comprising two separate units that are movable in relation to each other, one of said units carrying the said tape-gripping means, the other of said units carrying the said severing means and means for rendering the units fixed in relation to each other, whereby the length of the pieces of tape that are severed by the device may be varied.

3. The device of claim 2 in which the said cutter wheel units are two wheels mounted co-axially.

4. The device of claim 2 in which the said cutter wheel units are two wheels mounted co-axially one upon the other.

5. In a device for dispensing tape, means for holding a supply roll of tape, a cutter wheel adapted to receive tape from the roll and an anvil member adjacent to said cutter wheel, said cutter wheel having tape-gripping means positioned thereon adapted to contact a portion of the tape, severing means on said wheel positioned in such a manner that the tape passes over said severing means when it is trained around the wheel, the said wheel being positioned so as to press the severing means against the anvil member as the wheel rotates, thereby severing the tape with the severed portion still held by the tape-gripping means, in which the said cutter wheel comprises a gripping unit and a severing unit, the said gripping unit comprising a hub and two flanges which carry the said gripping means, the said severing unit comprising a nave with severing edges mounted thereon, the said nave being journaled on the said hub co-axially therewith so that the said edges and gripping means are presented in alternation around the wheel's periphery, and means for rendering the gripping and severing units fixed in relation to each other, whereby the distance from a gripping means to the next succeeding severing edge may be varied thereby varying the length of the pieces of tape that are severed by the device.

6. The device of claim 5 with means for pressing the tape against said gripping means.

7. The device of claim 5 with means for pressing the tape against the said gripping means, and guide means for releasably holding the uncut tape in a position to be contacted by the gripping means.

8. In combination in a motor operated dispenser for pressure-sensitive adhesive tape, driving means for advancing tape from a roll thereof, mechanical means for automatically severing a predetermined length of tape thus advanced, means for adhesively holding the severed length of tape in position for grasping and removal when desired, and control means responsive to removal of the severed tape to automatically initiate operation of the tape-advancing means following removal of the tape and also including means to automatically terminate operation following the severing and positioning for removal of the next length of tape, so that the removal of a severed length of tape is automatically followed by the advance and severing of a further length of tape made ready for removal.

9. In a tape dispenser, means for holding a supply roll of tape, means for withdrawing the tape and mechanical means for automatically severing it into lengths and holding the severed lengths in position for grasping and removal at a dispensing station, power driving means for intermittent operation of the dispenser in dispensing cycles whereby successive pieces of severed tape are brought to rest at the dispensing station in step-by-step fashion, including control means adapted to be actuated in response to the removal of a severed length of tape, so that upon such removal the dispenser is set in operation to dispense the next length of tape.

10. The device of claim 9 in which the power driving means includes an electric motor and the control means includes a switch in the circuit of said motor adapted to be closed in response to the removal of severed tape.

11. In a tape dispenser, means for holding a supply roll of tape, means for withdrawing the tape and severing it into lengths and holding the several lengths in position for grasping and removal at a dispensing station, means including a motor for intermittent operation of the dispenser in dispensing cycles whereby successive pieces of severed tape are brought to rest at the dispensing station in step-by-step fashion, two switches connected in the circuit of said motor so that both must be closed to start the motor, a switch trip adjacent to said switches positioned and adapted to be moved during removal of a severed length of tape by the pressure thereof so as to close one of said switches and adapted to return to its normal position after pressure of the tape is removed so as to close the second of said switches, whereby the initiation of a cycle will ordinarily be postponed until after the previously dispensed length of tape is clear of the dispenser.

12. In a device for dispensing tape, means for holding a supply roll of tape, a cutter wheel adapted to receive tape from the roll and an anvil member adjacent to said cutter wheel, said cutter wheel having tape-gripping means positioned thereon adapted to contact a portion of the tape, severing means on said wheel positioned in such a manner that the tape passes over said severing means when it is trained around the wheel, the said wheel being positioned so as to press the severing means against the anvil member as the wheel rotates, thereby severing the tape with the severed portion still held by the tape-gripping means, power driving means for intermittent operation of the dispenser in dispensing cycles whereby successive pieces of severed tape are brought to rest at a dispensing station in step-by-step fashion, including control means adapted to be actuated in response to the removal of a severed length of tape, so that upon such removal the dispenser is set in operation to dispense the next length of tape.

13. The device of claim 12 in which the power driving means includes an electric motor and the control means includes a switch in the circuit of said motor adapted to be closed in response to the removal of severed tape.

14. In a device for dispensing tape, means for holding a supply roll of tape, a cutter wheel adapted to receive tape from the roll and an anvil member adjacent to said cutter wheel, said cutter wheel having tape-gripping means positioned thereon adapted to contact a portion of the tape, severing means on said wheel positioned in such a manner that the tape passes over said severing means when it is trained around the wheel, the said wheel being positioned so as to press the severing means against the anvil member as the wheel rotates, thereby severing the tape with the severed portion still held by the tape-gripping means, means including a motor for intermittent operation of the dispenser in dispensing cycles whereby successive pieces of severed tape are brought to rest at a dispensing station in step-by-step fashion, two switches connected in the circuit of said motor so that both must be closed to start the motor, a switch trip adjacent to said switches positioned and adapted to be moved during removal of a severed length of tape by the pressure thereof so as to close one of said switches and adapted to return to its normal position after pressure of the tape is removed so as to close the second of said switches, whereby the initiation of a cycle will ordinarily be postponed until after the previously dispensed length of tape is clear of the dispenser.

15. In a device for dispensing tape, means for holding a supply roll of tape, a wheel adapted to receive tape from the roll, said wheel having tape-gripping means positioned thereon adapted to contact a portion of the tape, means on the wheel and means adjacent to said wheel adapted to form two coacting severing means, one of the said coacting means comprising a cutting edge and the other comprising a member against which the edge may press the tape, the said two coacting means being positioned so that the tape is pressed therebetween as the wheel rotates so as to sever the tape with the severed piece still held by the gripping means, the severing means which is on the wheel and the gripping means being adjustable in relation to each other to vary the distance between them, whereby the length of pieces of tape that are severed by the device may be varied.

16. In a device for dispensing tape, means for holding a supply roll of tape, a wheel adapted to receive tape from the roll, said wheel having tape-gripping means pivotally mounted thereon adapted to contact a portion of the tape, means on the wheel and means adjacent to said wheel adapted to form two coacting severing means, one of the said coacting means comprising a cutting edge and the other comprising a member against which the edge may press the tape, the said two coacting means being positioned so that the tape is pressed therebetween as the wheel rotates so as to sever the tape with the severed piece still held by the gripping means, the severing means which is on the wheel and the gripping means being adjustable in relation to each other to vary the distance between them, whereby the length of pieces of tape that are severed by the device may be varied, and means for turning the gripping means while holding a severed length so as to thrust a free portion of the length out away from the wheel in position for ready removal.

17. In a device for dispensing adhesive tape, a cutter wheel adapted to receive tape from a supply roll, a plurality of tape-gripping elements on the wheel adapted to contact the tape at spaced-apart portions, a plurality of severing edges positioned to underlie the tape when it is trained around the wheel in contact with the gripping elements, and an anvil member adjacent the wheel so positioned that the edges are successively pressed against the anvil as the wheel rotates so as to sever the tape with the severed length held by a gripping element, the gripping elements and the severing edges being adjustable in relation to each other to vary the distance between them whereby the lengths severed by the device may be varied.

18. In a device for dispensing adhesive tape, a cutter wheel adapted to receive tape from a supply roll, a plurality of tape-gripping elements on the wheel adapted to contact the tape at spaced-apart portions, a plurality of severing edges positioned to underlie the tape when it is trained around the wheel in contact with the gripping elements, and an anvil member adjacent the wheel so positioned that the edges are successively pressed against the anvil as the wheel rotates so as to sever the tape with the severed length held by a gripping element, the cutter wheel comprising two separate units that are movable in relation to each other, one of the units carrying the gripping elements, the other carrying the severing edges, and means for rendering the units fixed in relation to each other, whereby the length of the pieces of tape that are severed by the device may be varied.

19. The device of claim 18 in which the said cutter wheel units are two wheels mounted coaxially.

ARTHUR A. ANDERSON